United States Patent

Nelson

[15] 3,639,688

[45] Feb. 1, 1972

[54] SERVOMECHANISM FOR INCREMENTING STRIP RECORD TRANSPORTING SYSTEMS

[72] Inventor: Robert Gordon Nelson, San Jose, Calif.

[73] Assignee: International Business Machines Corporation, Armonk, N.Y.

[22] Filed: Aug. 24, 1970

[21] Appl. No.: 66,202

[52] U.S. Cl. ....................178/6.6 P, 178/6.6 A, 179/100.2 T, 179/100.2 S

[51] Int. Cl. ....................G11b 15/52, H04n 5/78, G11b 3/40

[58] Field of Search .............179/100.2 T, 100.2 HI, 100.2 S, 179/100.2 B; 340/174.1 B; 178/6.6 A, 6.6 P, 6.6 TC

[56] References Cited

UNITED STATES PATENTS 3,571,528 3/1971 Smith..............................179/100.2 B

*Primary Examiner*—Bernard Konick
*Assistant Examiner*—Steven B. Pokotilow
*Attorney*—Hanifin and Jancin and George E. Roush

[57] ABSTRACT

An audio-video signal storage device of the type in which a magnetic tape is advanced in increments of one or more inter-track spacing intervals is enhanced for continuous incrementing by a servosystem comprising a pair of electromagnetic transducers spaced apart along one portion of the tape at an interval of one-half (or an odd multiple) of the increment and a generator establishing a reference pulse at a time of predetermined, preferably maximum velocity of the tape as it is being incremented. That reference pulse is applied to one of the transducers for recording on one portion of the tape. As that portion of the tape is incremented the other of the transducers reproduces that pulse and it is compared in time with a subsequent reference pulse from the generator for producing an error signal. The error signal indicates concurrent, leading, or lagging conditions for operating conventional speed controlling servosystems. Address information for direct access of information stored on the tape is recorded and reproduced with the same two servomechanism sensing transducers and conventional access mechanism control circuitry.

15 Claims, 11 Drawing Figures

*INVENTOR*

ROBERT G. NELSON

*BY* George E. Roush [signature]

ATTORNEY

SERVOMECHANISM FOR INCREMENTING STRIP RECORD TRANSPORTING SYSTEMS

The invention stems from the same endeavor as the inventions of Ernie G. Nassimbene disclosed and claimed in U.S. Pat. application Ser. No. 653,782 for "Video Recording Technique" filed on July 17, 1967, now abandoned in lieu of a continuation-in-part U.S. Pat. application Ser. No. 697,846 filed on Jan. 15, 1968 for "Reproduction System," now U.S. Pat. No. 3,571,500, and U.S. Pat. application Ser. No. 736,179 for "Reproduction System" filed on July 19, 1968, now U.S. Pat. No. 3,541,272, all assigned to the International Business Machines, Incorporated.

The invention relates to signal-storage systems utilizing strip record media incremented with respect to signal transducing apparatus, and it particularly pertains to servomechanism error signal generating circuitry for such transporting systems.

There are conventional video signal-recording and -reproducing systems utilizing continually moving magnetic tapes helically wound about continually rotating formers, usually in the form of drums. The drums contain recording and reproducing electromagnetic transducers which are brought into magnetic coupling with the magnetic tape for both recording and reproducing video signal information on the tapes. More recently video and audio signal-recording and -reproducing systems have been developed so that desired portions of the recorded information may be reproduced continually as long as desired. This is especially desirable with video signals for cathode ray tube displays where it is often desired to reproduce a complete frame for a relatively long period of time. In such apparatus the magnetic tape is incremented longitudinally while the tape is uncoupled from the electromagnetic transducer. Any recording or reproducing takes place only while the tape is fixed in position. The tape is therefore incremented between fixed transducing positions. While major problems in video displays operating on signals in storage have been solved by apparatus of this type, new problems have arisen; one such problem is incrementing control. Prior art arrangements have incorporated servomechanism of substantially conventional types which treat the overall operation on an averaging basis. While these prior art arrangements have been feasible for many applications, they leave much to be desired for a system offering high quality performance. Examples of the prior art arrangements are to be found in the following U.S. Pat. Nos.:

| | | | |
|---|---|---|---|
| 2,832,840 | 4/1958 | Morin | 179–100.2 |
| 2,913,707 | 11/1959 | Goldberg et al. | 340–174 |
| 3,095,473 | 6/1963 | Roizen | 178–6.6 |
| 3,180,930 | 4/1965 | Bounsall | 178–6.6 |
| 3,229,035 | 9/1966 | Bounsall | 178–6.6 |
| 3,243,798 | 3/1966 | Senders | 340–324 |
| 3,264,453 | 8/1966 | Barnard et al. | 235–61.11 |
| 3,395,401 | 7/1968 | Silverman | 340–173 |
| 3,463,878 | 8/1969 | Nassimbene | 178–6.6 |
| 3,474,429 | 10/1969 | McCowen et al. | 340–174.1 |

and in the technical literature: C. D. carman and R. W. Van Pelt; "Digital Speed Control System"; IBM Technical Disclosure Bulletin, Vol. 9, No. 10, Mar. 1967, pages 1315–7.

In these examples of the prior art which specifically treat servomechanisms, conventional lead-lag voltage-generating systems are arranged to control slip clutches and like controlling or speed-changing apparatus, or circuitry responsive to start, stop and rewind signals is arranged to interrupt the servomechanism. These arrangements are confined to operations on a continuously running sensing intermittent synchronizing basis.

According to the invention an error signal is generated directly in response to the consequential movement of incremented strip record media. A record media transducing device is arranged to scan a length of a strip record medium in two fields. As the transducing device passes the first field, the medium is stationary and the portion of the medium containing the second field is being incremented. ON completion of this incrementing half cycle the transducing device scans the second field which is now held stationary and the portion of the medium forming the first field is incremented. This action is readily effected by pulling a loop in the strip record medium between the two fields in one half of the cycle and flattening the loop in the other half of the cycle. A pair of fixed record media transducer devices are arranged along the strip record medium in first field and spaced apart at an interval of (including an odd multiple of a predetermined portion of the increment for which the apparatus is designed). The first of these transducer devices is for recording and the second is for reproducing. Associated with the scanning transducing device is a pulse generator which will generate a pulse as the scanning transducer device passes the point of maximum acceleration of the strip record medium in the second field. In recording video signal information, for example, the fixed-recording transducer is pulsed while the first field of the strip record medium is stationary and preferably as the scanning transducer device is passing the location of the pulsed transducer or elsewhere of the beginning of the field. When the scanning transducer device reaches the beginning of the recording of the second field portion, the incrementing of first field portion will begin. As the moving transducer device passes the point of maximum acceleration of the tape at the second field portion a pulse is generated by the previously mentioned pulse generator. At this time ideally the fixed reproducing transducer device reproduces the pulse previously recorded. The times of arrival of the two pulses are compared in a comparator circuit. If they arrive simultaneously the circuit controlling servomechanism is left unaffected. If the fixed reproducing transducer produces a pulse before the generator does, the servomechanism is provided with an error signal tending to shorten the increment; and if the reproducing transducer produces a pulse later the servomechanism is thereby adjusted to lengthen the increment. In reproducing information from this strip record medium the recording fixed transducer device is idle since the pulses are already recorded on the strip record medium. The reproducing fixed transducer device and the pulse generator operate on these prerecorded pulses in exactly the same manner as described for the original recording.

Further, according to the invention, addressing of pertinent sectors of the strip record medium is accomplished by pulsing the fixed-recording transducing device in pulse position coding during incrementing. Preferably, a pulse of opposite polarity is used for addressing for better isolation from the servo error signal-related pulses. If a binary naught is to be recorded a negative pulse is placed in one position with respect to the servo pulse, preferably halfway between servo pulses, and a binary unit is designated by pulsing at a substantially different position. This addressing information can be, and is preferably, recorded at the same time as the stored information is recorded on the strip record medium. The fixed transducer reserved for recording can be used for scanning pulse reproducing where the operation is reversible, as in magnetic tape-storage systems.

This servomechanism, according to the invention, is especially adaptable to the cathode-ray tube (CRT) display arrangement for video information in the manner of a conventional broadcast television receiver and accompanied by sound from an audiofrequency signal track on the magnetic tape. The display is arranged to stop the motion on the CRT screen by halting the tape and repeatedly scanning the same fields continuously until it is desired to proceed further.

In order that the practical aspects of the invention may be readily attained in practice a preferred embodiment of the invention, given by way of example only, will be described hereinafter with reference to the accompanying drawing forming a part of the specification and in which.

Figure 6:
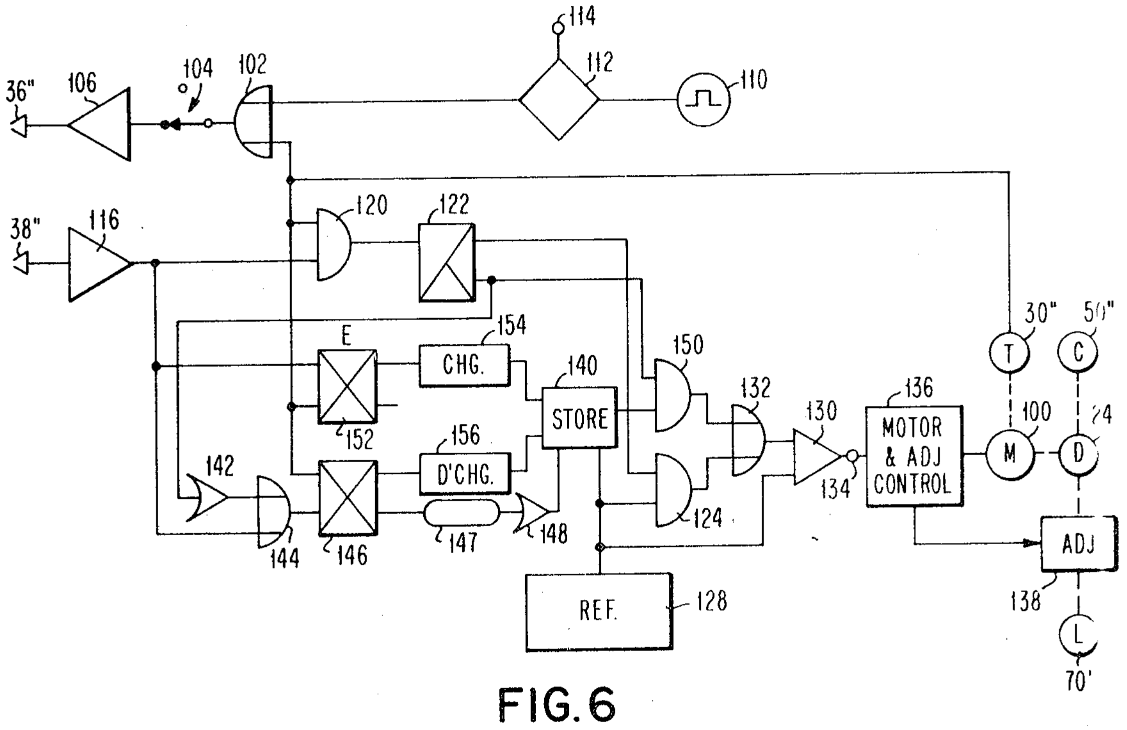
Figure 5A:
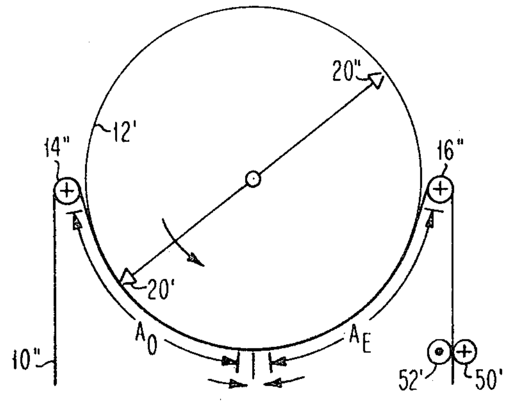
Figure 5D:
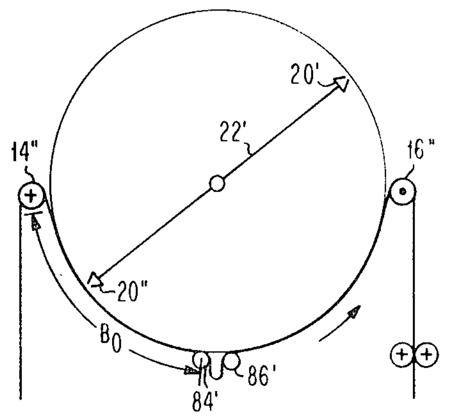
Figure 5B:
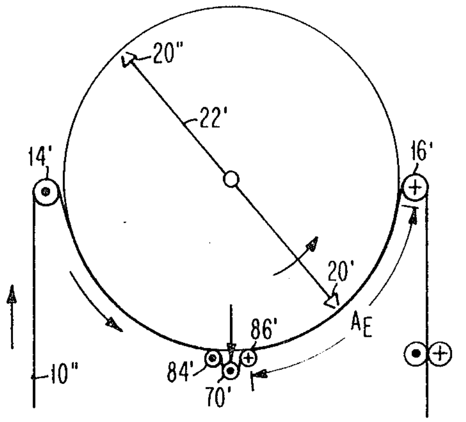
Figure 5E:
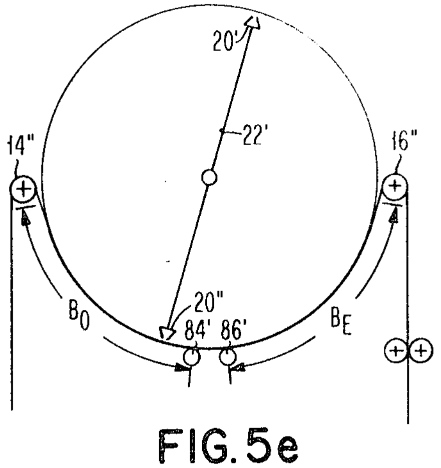
Figure 5C:
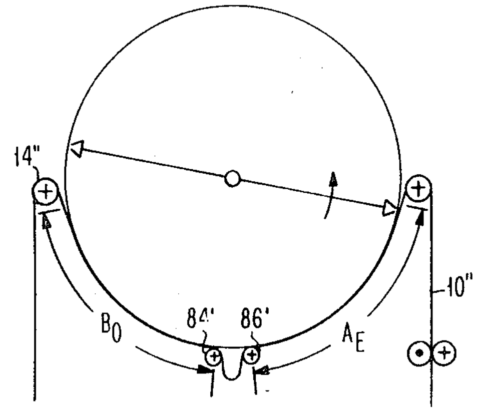
Figure 5F:
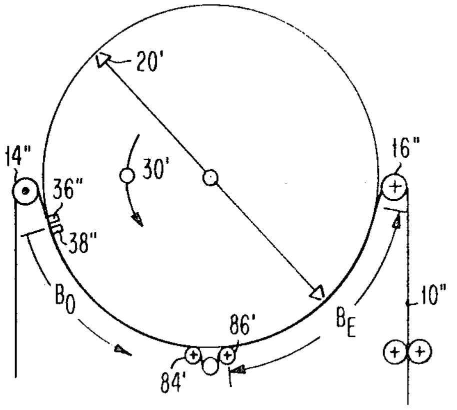

FIGS. 5*a* through 5*f* are schematic illustrations of the operation of the system according to the invention; and FIG. 6 is a functional diagram of logical circuitry according to the invention.

Figure 1:
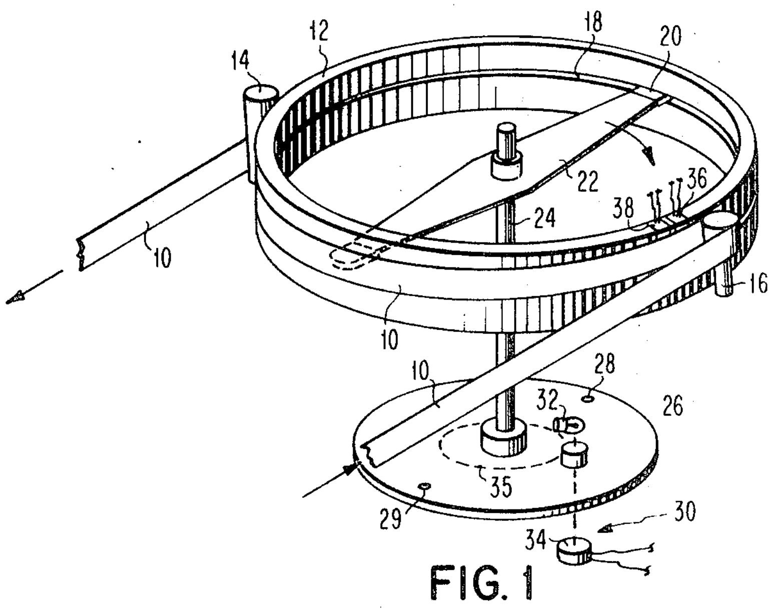
FIG. 1 is an isometric illustration of essential apparatus according to the invention.
Figure 2:
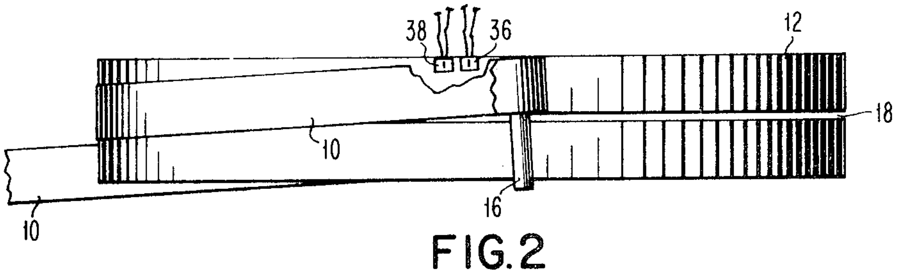
FIG. 2 is an elevation view of a portion of apparatus like that illustrated in FIG. 1.

A perspective view of the essential components according to the invention are shown in FIG. 1. A strip record medium, shown here as a length of magnetic tape 10, is arranged on a former 12 of annuloidal form, referred to in the vernacular as a drum. The magnetic tape 10 may be looped about the former 12 from one side, if desired. The reversing arrangement shown in connection with a pair of rollers 14, 16 is not essential to the invention but it affords several advantages as will later appear, in loading a cartridge of the tape into the machine, and also in that two, or even more, cartridges may be arranged about a single scanning drum. The latter is of decided advantage in operations where data from one tape is partially transferred to another tape and like procedures. The former 12 is essentially made in two parts separated by a slit 18 intermediate the upper and lower edges of the former 12. The former is made of mu metal, aluminum, or other magnetic shielding material and the slit 18 is arranged to accommodate the pole faces of electromagnetic transducers 20 (one of which is hidden in this view) which contact the tape 10 or is held therefrom by a predetermined clearance as required. The electromagnetic transducers 20 are borne by an arm 22 supported on a shaft 24 which is continually rotating at a predetermined constant angular velocity by conventional means, such as an electric motor (not shown). On the shaft 24 is a tachometer disk 26 in which there are a pair of apertures 28 and 29 corresponding to the transducers 20. The apertures 28 and 29 are arranged to pass between elements of a tachometer pulse generator 30. The latter is shown as a source of light, shown here as a lamp 32 with a concentrating lens, and a photoresponsive element 34. The tachometer disk 26 may have other apertures 35 in predetermined relationship for other purposes associated with the apparatus according to the invention. A pair of transducers 36 and 38 are arranged in the former 12 for recording and reproducing data near the edge of the magnetic tape 10 as will be described further. The relationship of the transducers 36 and 38 with respect to the magnetic tape 10 is also shown FIG. 2. Here it can be seen that the tape 10 is wrapped in a helical pattern about the former 12 so that the track laid down by the electromagnetic transducer 20 operating in the slit 18 runs transversely of the magnetic tape 10 at a decided angle.

Figure 3:
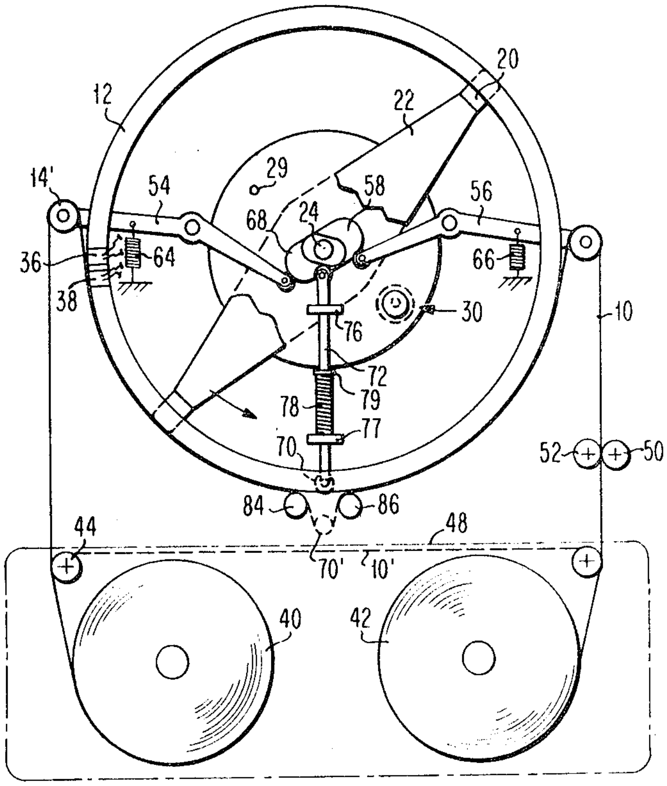
FIG. 3 is a schematic plan view illustrating the operation schematically of the transporting apparatus and the servomechanism error signal generating components.

A plan view of an incremental tape storage of the type described above is shown in greater detail in FIG. 3. The tape 10 in this arrangement issues from a supply reel 40 and is wound on a takeup reel 42 of conventional form. The advantages of tape cartridges are afforded in this arrangement. A pair of rollers 44, 46, shown within a chain line 48 representing the outlines of a cartridge in general, are arranged in the machine to guide the tape 10. When a cartridge is employed the rollers 44 and 46 are contained in the cartridge and the tape is wound on the reels so that a portion 10′ shown by the dotted line extends over the rollers 44 and 46. The cartridge is placed in the machine in conventional manner and the web 10′ is pulled out for manual loading. The tape 10 is brought around the roller 14′, around the former 12, around the roller 16′ and between a drive capstan 50 and a pressure roller 52. In the arrangement shown the rollers 14′ and 16 are mounted on levers 54 and 56 respectively. A lever cam 58 fixed to the rotating shaft 24 bears on cam follower 60 and 62 for positioning the levers 54 and 56 in the incrementing cycle. Springs 64 and 66 urge the arms 54 and 56 respectively toward the lever-operating cam 58 and incrementing-looping cam 68 is also fixed to the rotating shaft 24 in predetermined relationship to the lever-operating cam 58 as will be discussed hereinafter. A tape-looping roller 70 is carried on a tape-looping rod 72 which has a cam follower 74 in contact with a tape-looping cam 68. The rod 72 is carried in pillow blocks 76 and 77. A compression spring 78 is arranged between the outer pillow block 77 and a collar 79 for urging the cam follower 74 toward the looping cam 68. The looping roller 70 is thrust forward by operation of the cam 68 to pull a loop shown by the dotted lines 80 and the outer position 70′ of the roller 70. A pair of rollers 84 and 86 are resiliently urged against the web of the tape 10 to maintain the balance of the tape against the former 12. In cartridge loading applications, the rollers 84 and 86 are preferably arranged to moved outwardly of the former 12 for inserting the web of the tape 10 between the rollers and the former 12. The cam 68 is designed and arranged to be held within the former 12 at all times except when incrementing the tape so that it does not interfere with tape-loading operation.

Figure 4:
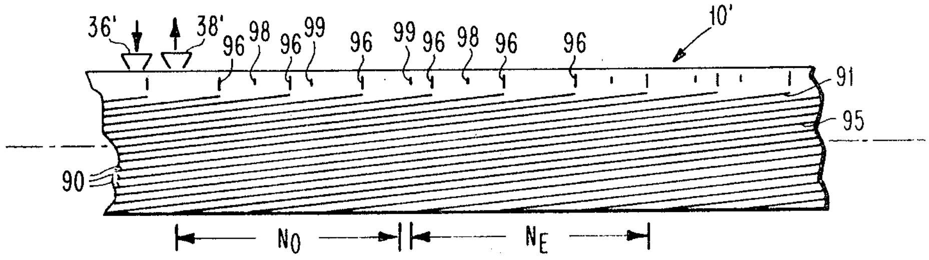
FIG. 4 is a schematic representation of a portion of magnetic tape according to the invention.

FIG. 4 is a schematic illustration of a length of tape 10′ as it is used according to the invention. The transducing device 20 records and/or reproduces in magnetic tracks 90 which angle across the tape 10′ in the manner shown. A particular track 91 is under consideration as a video signal track. This track 91 is divided into three portions. The first portion has the information recorded therein for displaying the odd field $N_O$ of a television raster-type display. The even field $N_E$ is recorded at the other end of the track 91, while a portion between the $N_O$ and $N_E$ fields contains the usual fly back and synchronizing pulses recorded in a tape length of one increment. In some applications where both video and audio signal recording is desired, it is contemplated that two arms, like the arm 22, are arranged to record on and reproduce from the tape 10′. The two arms move at differing speeds. It is contemplated that the audio arm move at a speed much slower than that of the video arm. Quite long audio messages can be stored for each frame of the visual display. It is contemplated that a ratio of 264 to 1 be used so that video signal information for displays may be recorded by the transducer normally reserved for audiofrequency signal recording. This is advantageous for recording and reproduction in digital fashion over a commercial communications transmission line for subsequent reproduction at the normal rate by the normal video signal-reproducing transducing device. In such an arrangement the audiofrequency signal transducer and the video signal-transducing devices are operative at a spacing of about one-sixteenth of an inch so that the slit 18 is not overly large.

Along one edge of the tape 10 is a narrow track for recording servo marks 96 equidistantly along the tape 10, one servo mark 96 per frame. When it is desired to address a sequence of signals on the tape 10, address marks 98 and 99 are recorded preferably in magnetic polarity opposite to that of the servo marks 96, as an added advantage in distinguishing address coding from servocontrol. A binary-coding system is preferably used although it is conceivably possible to use other systems, even up to decimal. As shown, a simple pulse position coding is used wherein binary units are indicated by address mark 98 substantially equidistant between the adjacent servo marks 96 and binary naughts are indicated by address marks 99 definitely not equidistant. Simple logic and integrating circuitry is used to provide extremely accurate identification of the address information.

The manner of incrementing the magnetic tape strip record medium is shown schematically in FIG. 5. The tape 10″ lies snugly about the former 12′ as shown in FIG. 5*a*. One transducing device 20′ is scanning the odd field, $A_O$, of frame A under consideration. The pressure roller 52′ is released so that the capstan 50′ does not exert any driving force on the tape 10″. Under these conditions the transducers 20′ and 20″ continually scan the odd and even fields in succession of the frame A under consideration until a command to increment is given. A command to increment is executed as a transducing device 20′ or 20″ begins to scan the even field, that is, as the transducing device passes the roller 86′. At this point in time the roller 14″ is moved to relax the tension on the tape 10″ in the odd-frame-scanning sector. At the same time the looping roller 70′ is moved outward between the rollers 84′ and 86′ as shown in FIG. 5*b* to draw the tape 10′ around the roller 14″ and the roller 84′. The action continues until the looping roller 70' has drawn a loop exactly equal to one increment. In practice an increment of 0.333 inch has been completely satisfactory in continuously incrementing the tape 10' for displaying 30 frames per second on a cathode-ray tube display. As the transducing device 20' scans the end of the even field of the frame A as shown in FIG. *5c* the odd field of the succeeding frame B is in place. Invariably as the transducing 20'' scans the odd field of the frame B the pressure roller 52' is brought to bear on the tape 10'' for movement by the capstan 50'' as shown in FIG. *5d* for flattening the loop and thus incrementing the portion of tape having the even field. Fixed frame operation is then possible for the second frame B as shown in FIG. *5e*. For additional passes of the transducing device 20 over the same frame the pressure roller 52' and the capstan 50' must be disengaged as the tape may be desired to be held stationary for some length of time. For continuous incrementing the capstan 50', which is geared to the drive shaft 24 (FIG. 3) constantly urges the tape 10 due to action of the pressure roll 52 and the portion of the tape 10 about the former 12 is kept taut by means of the rollers 14' and 16' moving on the respective arms 54 and 56 urged by strings 64 and 66 respectively. The incrementing is controlled by the travel of the incrementing bar 72. The arrangement preferably is precisely dimensioned for a fixed value of increment, but adjusting measures may be prescribed. Adjustment of the incrementing function is contemplated in several different arrangements. The length of the looping arm 72 in one arrangement is varied by simple means, for example, rotating a screw joining two portions of the bar to change the length. A hydraulic expansion cylinder may be interposed in the bar 72 for this purpose. The pillow block 79 may be adjustable in position and a spring-loaded stopping pin used to stop the travel of the looping bar 72 at the proper point. Preferably, the cam 68 is tapered and mounted to slide up and down upon the shaft 24 so that adjusting the height of the cam will control the distance to which the looping bar 72 travels outwardly of the former 12. Likewise the cam 56 is tapered and adjusted in complementary fashion so that the length of tape being incremented is precisely constant over the whole operation.

Adjustment of the loop 80, by any of the structures described hereinbefore or other structures suggested by those skilled in the art, is accomplished response to an error signal generated in transporting the strip record medium. As shown schematically in FIG. *5f* the tachometer pulse generator 30'' is arranged to produce a pulse at a time when the tape 10'' passing the transducers 36'' and 38'' is substantially at maximum acceleration. In the original recording of signals on the tape 10'' the servo pulse is applied to the recording transducer 36'' when the transducer 20' is in the $B_0$ field and the tape 10'' is stationary. As that same pulse passes the reproducing transducer 38'' one-half (or an odd multiple thereof) of an increment later, it is compared in phase with the servo pulse from the tachometer generator. If the increment is proper the error signal generator so denotes, and the error signal generator denotes both lead and lag if the incrementing is not in proper synchronism. The associated apparatus is arranged to decelerate or accelerate the incrementing rate accordingly.

A functional diagram of logical circuitry for accomplishing the function is shown in FIG. 6. An electric motor 100 is arranged to rotate the drive shaft 24'' which is also geared to drive the capstan 50''. Alternately, the capstan 50'' is separately driven and/or servoed if desired. Separate control is arranged to operate the pressure roller in conventional fashion. Preferably a separate servomechanism is arranged to control the motor speed in response to incoming 59.59 Hz. video signals in conventional fashion. The tachometer generator 30'' is also on the shaft 24. Tachometer generator pulses are applied through an electronic OR-gating circuit 102, a switch element 104 and a transducer-driving amplifier 106 to the recording transducer 36''. Where the mechanism is designed for using this pulse for recording, the advantage of so doing lies in having the same wave shape of pulses at the comparing circuitry. A separate pulse generator can be used. If address pulses are to be recorded an address pulse generator 110 is keyed by means of a modulator 112 in response to address information applied at address information input terminals 114. Recording servo-pulse-timing data is also applied at the terminals 114 if the pulse generator 30'' is not designed for recording. As previously mentioned the modulator 112 and the amplifier 106 preferably are arranged to apply pulses of opposite polarity for the latter purpose, although this is not an absolute essential. Previously recorded servo pulses on the tape are reproduced by the reproducing transducer 38'' and amplified in a reproducing amplifier 116.

The ideal situation results from coincident generation of servo pulses and reproduction of previously recorded servo pulses. This is essentially accomplished by applying the output of the servo pulse generator 30'' to a coincident AND-gating circuit 120 along with the output of the reproducing transducer amplifier 116. The output of the coincident AND-gating circuit 120 indicates that no correction is required and can be applied to conventional servo-correction disabling circuitry in conventional manner. In the arrangement shown coincidence triggers a monopulse flip-flop circuit 122 for reasons which are to appear later. Because of the gross inconsistency with which the terminology relating to the many types of "multivibrators" and similar circuits is used, the less frequently but much more consistently used term "reciproconductive circuit" will be used in the interest of clarity as a base for defining the terminology used hereinafter. As employed herein, the term "reciproconductive circuit" is construed to include all dual current flow path element (including vacuum tubes, transistors and other current flow-controlling devices) regenerative circuit arrangements in which current alternates in one and then the other of those elements in response to applied triggering levels or pulses. The term "free-running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable reciproconductive circuit" indicates such a circuit in which a single trigger is applied to a single input terminal to trigger the reciproconductive circuit to the unstable state once and return. This monostable version will be referred to as a "monopulse flip-flop circuit" or "single-shot flip-flop circuit" which will distinguish it from the earlier, and more appropriately used, term "flip-flop" and because it is shorter than the term "self-restoring flip-flop circuit" later used in an attempt to more clearly distinguish from the term "unistable flip-flop circuit" employed even later. "Bistable reciproconductive circuits" are divided into the "binary reciproconductive circuit" which has a single input terminal to which triggering pulses are applied to alternate the state of conduction each time a pulse is applied. Such a circuit will be referred to hereinafter as a "binary flip-flop." The "bistable reciproconductive circuit" having tow input terminals between which successive triggering pulses must be alternately applied to switch from one stable state to the other has been called both a "flip-flop" and a "lockover circuit." This version hereinafter will be referred to as a "bilateral flip-flop circuit."

The monopulse flip-flop circuit 122 is coupled to an AND-gating circuit 124 along with a lead from a reference potential source 128 which is connected to one terminal of a differential amplifier circuit 130. The output of the AND-gating circuit 124 is at the reference potential level when the monopulse flip-flop circuit 122 is in the coincidence condition. This output is applied through an OR-gating circuit 132 to the other input terminal of the differential amplifier circuit 130. In this manner reference potential appears at both terminals of the differential amplifier circuit 130 to provide a mean output level at output terminals 134. This level is applied to a motor and adjustment control circuitry 136 where it is utilized to maintain steady control because synchronism is indicated by the mean signal level at the output terminals 134. The motor-controlling portion of circuitry 136 is connected to the motor 100. Other portions of this circuitry responsive to the voltage level at the output terminals 134 is connected to an adjusting device 138 which is interposed between the drive shaft 24'' and the looping roller 70'. The adjusting apparatus 138 is responsive to voltage for adjusting the length of the looping rod 72, or the position of the adjustable stop 79 or the height of the cam 68 as previously mentioned, and these arrangements are well within the skill of the artisan using conventional techniques. The reference source 128 is also connected to error signal storage circuitry 140. The stable output terminal of the monopulse flip-flop circuit 122 is differentiated in a conventional differentiating circuit 142 for applying a pulse on restoration of the monopulse flip-flop circuit 122 through an OR-gating circuit 144 to a bilateral flip-flop circuit 146 to reset the latter. The reset terminal of the flip-flop circuit 146 is applied through a delay element 147 to another conventional differentiating circuit 148 for applying a pulse shortly after resetting of the former circuit to the error signal storage circuitry 140. The storage circuit 140 preferably contains a capacitor and circuitry for charging the capacitor to the potential of the reference source 128 each time a differential output pulse from the differentiator 148 is applied. The potential on this capacitor is applied to an AND-gating circuit 150 which is enabled by the stable output of the monopulse flip-flop circuit 122 and this reference source level is passed through the OR gating circuit 132 to the differential amplifying circuit 130. Thus the mean output signal level at terminals 134 is maintained according to the operation of the error signal storage circuitry until the servo pulses are received. An early servo pulse reproduced by the transducer 38'' is applied to a bilateral flip-flop circuit 152 to set the latter and activate a charging circuit 154 which is coupled to the error signal-storing circuit 140. This will charge the storage unit, previously characterized as a capacitor in the preferred form, above the reference value by an amount dependent on the time between the arrival of the early servo pulse and a pulse from the tachometer generator pulse 30'' which is applied to the reset terminals of the bilateral flip-flop circuit 152 which deactivates the charging circuit 154. The same reference pulse is also applied to the set terminals of the bilateral flip-flop circuit 146 to activate a discharge circuit 156 which is also coupled to the error signal-generating and storage circuitry 140. This discharge circuit 156 is arranged to discharge the storage unit to a value below the reference value or the value last established by charging circuit 154 by a differential value dependent on the time between the tachometer generator pulse and the arrival of a late servo pulse at the reproducing transducer 38'' which is applied through the OR-gating circuit 144 to the reset terminals of the bilateral flip-flop circuit 146. This stops the operation of the discharge circuit 156. The error signal stored in the storage unit is then applied to the AND-gating circuit 150 for application through the OR-gating circuit 132 to the differential amplifier circuit 130. The differential output at the terminals 134 then controls the motor and/or the adjusting apparatus 138 in the proper direction for bringing the strip record-medium-incrementing system into synchronism.

Although the preferred embodiment of the invention utilizes magnetic tape as a strip record medium, it should be clearly understood that other strip record media may be used as well. For example, punched paper tape is frequently used to control animated electric signs and similar displays where a multiple of the electric lamps are turned on and off. In such a case the recording transducer 36 may be a paper punch and the reproducing transducer 38 may be an optical hole-sensing device, for example, of the type comprising the lamp 32, the lens 34 and the photosensitive element 30. The reversibility of the magnetic transducer is effective duplicated where necessary and/or desirable by designing the paper punch with a wide throat and arranging an optical hole-reader system to read through the tape through the throat of the punch. The transducing device 20 would be a photosensitive element for reproducing and the light source would be arranged external to the former 12 and shielded in conventional manner. A circular fluorescent lamp will provide satisfactory light source for this application. Punching the paper tape is preferably done at a slower rate so that the greater mass of a paper punch may be arranged to move around the former 12. For higher speed and greater density an inked paper tape is used. Reflecting optical readers are used in this instance and the recording element preferably is an adaptation of the conventional ink recorders used in radiotelegraph work applications. It is also contemplated that a deformable tape record medium be used with optical sensing of the resultant deformations. Heat-deforming and electric static-charge deforming apparatus are known, as are optical-sensing apparatus for reading the information recorded by the various deformations.

While the invention has been described in terms of a preferred embodiment with suggested variations, it should be clearly understood that those skilled in the art may make many changes and follow the teachings herein without departing from the spirit and scope of the invention as defined in the following claims.

The invention claimed is:

1. A servomechanism for incrementing strip record-medium-transporting systems of the type in which the strip record medium is incremented in two portions thereof by alternate holding and incrementing half-cycles, comprising means for so incrementing said medium, a pair of electromagnetic transducers spaced apart along a portion of the strip record medium to be incremented at an interval of a multiple including unity of a predetermined proportion of the increment, means for applying a reference pulse at a time a portion of the strip record medium adjacent said transducer is fixed in position to one of said transducers for recording on said strip record medium, means for reproducing the same pulse by the other of said transducers as said portion of said strip record medium is incremented thereby, and means for comparing the times of occurrence of said reference and said reproduced pulses for producing an error signal.

2. A servomechanism for incrementing strip record-medium-transporting systems as defined in claim 1 and wherein said strip record medium is magnetic tape.

3. A servomechanism for incrementing strip record-medium-transporting systems as defined in claim 1 and wherein said interval is substantially one-half the increment.

4. A servomechanism for incrementing strip record-medium-transporting systems as defined in claim 1 and wherein said strip record medium has both address and servomechanism recording performed in the same pass.

5. A servomechanism for incrementing strip record-medium-transporting systems as defined in claim 1 and incorporating means for pulsing said one transducer as said strip record medium is being transported thereby for recording digital address information on said medium.

6. A servomechanism for incrementing strip record-medium-transporting systems as defined in claim 5 and wherein said one transducer records pulses of one polarity for servomechanism purposes and pulses of the opposite polarity for addressing purposes.

7. A servomechanism for incrementing strip record-medium-transporting systems as defined in claim 6 and wherein said means for pulsing said one transducer is arranged to record binary units and naughts between servomechanism bits in pulse position coding.

8. A servomechanism for incrementing strip record-medium-transporting systems as defined in claim 1 and wherein said reference pulse is generated by means coupled to said incrementing means.

9. A servomechanism for incrementing strip record-medium-transporting systems as defined in claim 8 and incorporating an AND-gating circuit having one input terminal coupled to said reference pulse generator, another input terminal coupled to said servo-pulse-reproducing transducer and an output terminal, thereby to indicate coincidence of the pulses from said generator and said transducer.

10. A servomechanism for incrementing strip record-medium-transporting systems as defined in claim 8 and wherein said reference pulse is generated at a time of predetermined velocity of the portion of said strip record medium being incremented.

11. A servomechanism for incrementing strip record-medium-transporting systems as defined in claim 10 and wherein said predetermined velocity is substantially maximum velocity.

12. A servomechanism for incrementing strip record-medium-transporting systems as defined in claim 8 and incorporating a differential amplifying circuit having one input terminal coupled both to said reference pulse generator and to said reproducing transducer, another input terminal connected to a source of fixed reference potential and an output terminal at which an error signal is presented.

13. A servomechanism for incrementing strip record-medium-transporting systems as defined in claim 12 and incorporating an electronic-gating circuit interposed in the coupling between said reference pulse generator and said reproducing transducer and said one input terminal of said differential amplifier for connecting said source of reference potential to both input terminals of said amplifier for producing a predetermined error signal at said output terminal on coincidence of the servo pulses.

14. A servomechanism for incrementing strip record-medium-transporting systems as defined in claim 13 and incorporating a storage circuit coupled to said one input terminal of said differential amplifying circuit, a charging circuit coupled to said storage circuit, and a pair of flip-flop circuits having output terminals individually connected to said charging and discharging circuits and input terminals connected to said reference pulse generator and said reproducing transducer for increasing or decreasing the error signal in accordance with the time difference between servo pulses.

15. A servomechanism for incrementing strip record-medium-transporting systems as defined in claim 14 and wherein one of said flip-flop circuits is coupled to said storage circuit for resetting the same.

* * * * *